(12) United States Patent
Vance

(10) Patent No.: US 8,825,399 B2
(45) Date of Patent: Sep. 2, 2014

(54) SYSTEM AND METHOD OF PASSIVE AND AUTONOMOUS NAVIGATION OF SPACE VEHICLES USING AN EXTENDED KALMAN FILTER

(75) Inventor: Leonard D. Vance, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1215 days.

(21) Appl. No.: 12/178,866

(22) Filed: Jul. 24, 2008

(65) Prior Publication Data
US 2010/0036612 A1   Feb. 11, 2010

(51) Int. Cl.
*G01C 21/10* (2006.01)
*G05D 1/08* (2006.01)
*B64G 1/36* (2006.01)
*B64G 1/24* (2006.01)

(52) U.S. Cl.
CPC .............. *B64G 1/242* (2013.01); *G05D 1/0883* (2013.01); *B64G 1/36* (2013.01); *B64G 1/361* (2013.01)
USPC ............................................ 701/510; 701/13

(58) Field of Classification Search
USPC ........... 701/220, 480, 510, 13, 513, 519, 531; 342/107; 244/3.1, 3.15
See application file for complete search history.

(56) References Cited

U.S. PATENT DOCUMENTS

| 5,051,751 | A | 9/1991 | Gray | |
|---|---|---|---|---|
| 7,034,742 | B2 * | 4/2006 | Cong et al. | 342/70 |
| 7,394,046 | B2 * | 7/2008 | Olsson et al. | 244/3.1 |

OTHER PUBLICATIONS

Psiaki M.L., "Absolute orbit and gravity determination using relative position measurements between two satellites," Collection of Technical Papers, AIAA Guidance, Navigation and Control Conference, Aug. 20-23, 2007, Hilton Head, South Carolina, vol. 3, pp. 1-16.
Brammer, Robert F., "Real-time shipboard orbit determination using kalman filtering techniques," IEEE Transactions on Aerospace and Electronic Systems, (online) vol. AES-10, No. 4, Jul. 1974, pp. 492-496.
Cicci, D.A. et al., "Sensitivity of an extended kalman filter 1: Variation in the number of observers and types of observations," Applied Mathematics and Computation, (online), vol. 66, No. 2-3, Dec. 1994, pp. 233-246.

* cited by examiner

*Primary Examiner* — Stefanos Karmis
*Assistant Examiner* — Kalyanavenkateshware Kumar
(74) *Attorney, Agent, or Firm* — Eric A. Gifford

(57) ABSTRACT

It is presumed and commonly accepted by those skilled in the art of satellite navigation and Kalman filter design that the filter must be provided with the tracker position and velocity a priori in order to determine target position and velocity. Indeed, it is generally asserted that without a priori knowledge (known or measured values) of the tracker position and velocity, line of sight measurements between satellites do not contain adequate information to infer target states. Passive and autonomous navigation of space vehicles without a priori values for the position and velocity of either the target or tracker vehicle is achieved by reconfiguring the extended Kalman filter, or more generally any predictor/correction class filter, to include states for both the target and tracker vehicles. The target and tracker vehicles must both follow trajectories in an inertial frame of reference through the gravitational field of a gravitational body having a known gravitational model. The reconfigured filter simultaneously estimates the position and velocity of both tracking and target space-based vehicles from line-of-sight measurements.

16 Claims, 6 Drawing Sheets

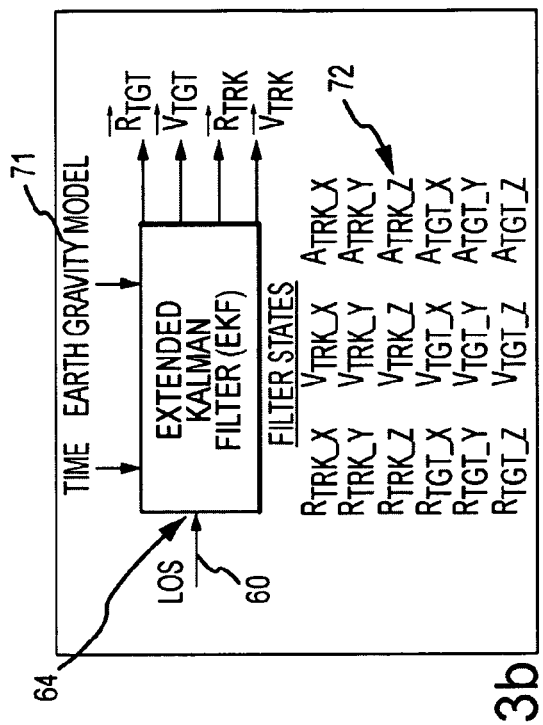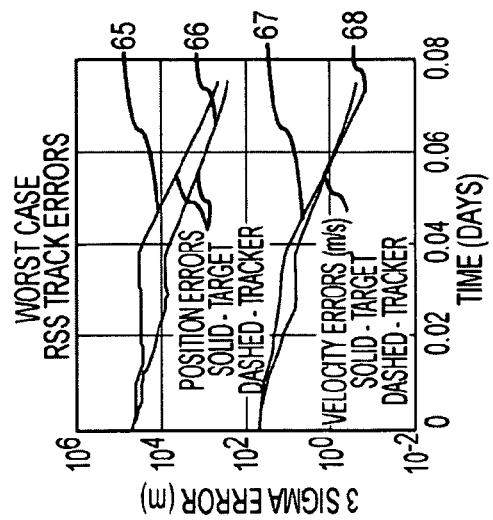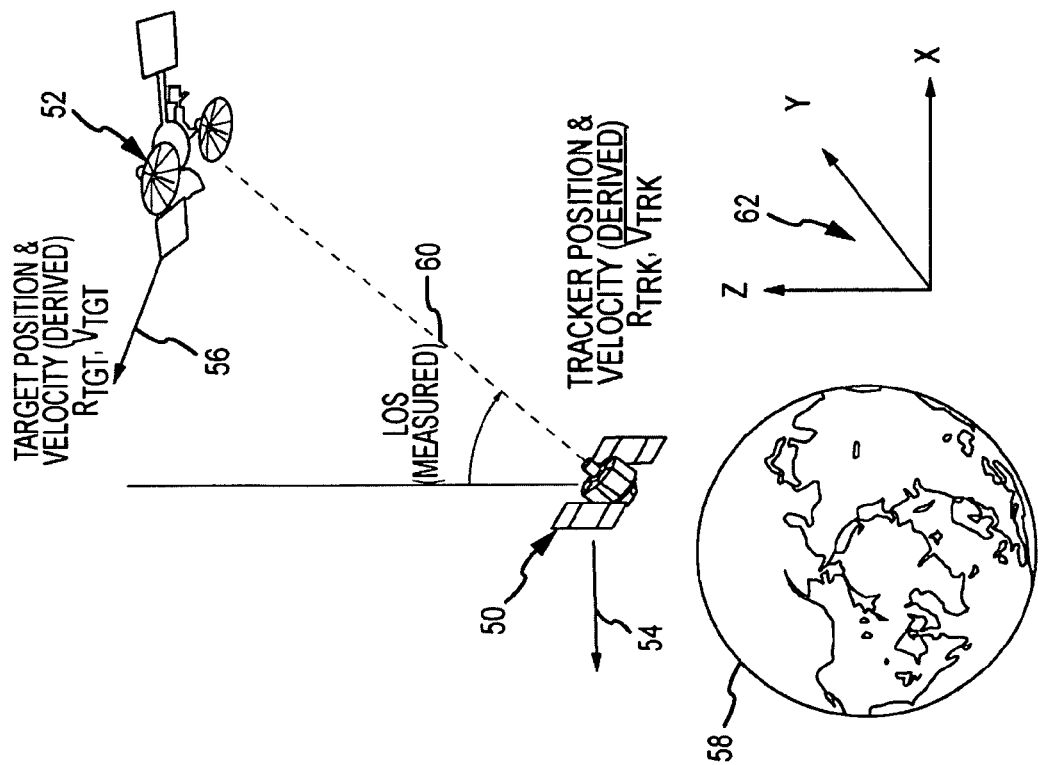
FIG. 3b
FIG. 3c
FIG. 3a

SYSTEM AND METHOD OF PASSIVE AND AUTONOMOUS NAVIGATION OF SPACE VEHICLES USING AN EXTENDED KALMAN FILTER

BACKGROUND OF THE INVENTION

1. Field of the Invention

This invention relates to space situational awareness and more particularly to a passive and autonomous system and method for simultaneously determining the position and velocity % of both tracking and target space-based vehicles from line-of-sight measurements.

2. Description of the Related Art

Space vehicle navigation done for satellites and/or probes uses a number of technologies such as optical trackers, radars, GPS etc. Though all these methods work, most of them require the active participation of ground based Earth assets to complete a solution. As the number of satellites in orbit and other space vehicles on non-orbiting trajectories continues to proliferate exponentially, the demands upon these aforementioned ground based assets are increasing in kind. To reduce the demands for expensive infrastructure upgrades, more satellites are commonly executing some form of autonomous navigation.

GPS is a commonly used autonomous navigation technique, but it becomes increasingly difficult to implement beyond the radius of its 12 hour orbit. Larger antennas are required to receive signals from the far side of the Earth and/or local satellite backlobes, thus increasing system mass and cost. Although considered autonomous. GPS techniques do rely on the network of GPS satellites. A passive and truly autonomous solution which does not rely on any other assets or require the addition of costly and heavy hardware is welcome, especially for deep space satellite implementations.

Extended Kalman Filters (EKFs) are snidely implemented recursive filters used to infer satellite position and velocity states from incomplete measurements such as angle only data from optical trackers, Doppler information from RF transmissions or range (with poor angle information) data from ground based radars. See "An Introduction to the Kalman Filter" SIGGRAPH 2001, Los Angeles, Calif., August 12-17, pp. 1-46, 2001 for a detailed presentation on Kalman Filters and Extended Kalman Filters.

The generic Extended Kalman Filter (EKF) is widely used and documented in many places. The classic predictor/corrector equations can lead to near optimal results as long as the time step is small enough so that the system can be viewed as linear for the duration of the chosen time step.

Predict $$\hat{x}_{k|k-1} = f(\hat{x}_{k-1|k-1}, u_k, 0)$$

$$P_{k|k-1} = F_k P_{k-1|k-1} F_k^T + Q_k$$

Update $$\tilde{y}_k = z_k - h(\hat{x}_{k|k-1}, 0)$$

$$S_k = H_k P_{k|k-1} H_k^T + R_k$$

$$K_k = P_{k|k-1} H_k^T S_k^{-1}$$

$$\hat{x}_{k|k} = \hat{x}_{k|k-1} + K_k \tilde{y}_k$$

$$P_{k|k} = (I - K_k H_k) P_{k|k-1}$$

where $\hat{x}_{k|k}$ is the estimate of the state vector at time k, $P_{k|k}$ is the error covariance matrix, $u_k$ is the control vector, $F_k$ is the state transition matrix, $Q_k$ is the process noise covariance, $z_k$ is an observation of the true state $x_k$, $H_k$ is the measurement matrix, $R_k$ is the measurement noise covariance, $y_k$ is the innovation, $S_k$ is the innovation covariance, and $K_k$ is the Kalman gain.

The state transition matrix ($F_k$) and measurement ($H_k$) matrices are defined to be the following Jacobians $$F_k = \left. \frac{\partial f}{\partial x} \right|_{\hat{x}_{k-1|k-1}, u_k}$$

$$H_k = \left. \frac{\partial h}{\partial x} \right|_{\hat{x}_{k|k-1}}$$

FIGS. 1a through 1c demonstrate the use of an EKF for tracking a target satellite 10 using angle-only information from a notional optical tracker 12 located on the surface of the Earth 14. With known values for the position ($R_{trk}$) and velocity ($V_{trk}$) of the fixed optical tracker in an inertial frame of reference centered on the Earth, the EKF 16 infers target position ($R_{tgt}$) and velocity ($V_{tgt}$) from state vector $x_k$ over time using line-of-sight (LOS) measurements 17 and an Earth gravity model that dictates how the EKF expects the target to move within the effects of the Earth's gravitational field. Essentially the gravity model provides an acceleration at any distance to the center of the gravitational body. In this case, a simple single point gravitational model is used, though more complicated models can be used to improve propagation accuracy.

The EKF state vector x has nine filter states for the target; position, velocity and acceleration for each of the X, Y and Z axes. The coordinate system is defined as Earth Centered Inertial (ECI). The updated values of the three position states infer target position ($R_{tgt}$) and the three velocity states infer target velocity ($V_{tgt}$). The updated values of the three acceleration states infer target acceleration ($A_{tgt}$) although that is not typically an output of interest.

x=[r(1) target x position estimate,
r(2) target y position estimate,
r(3) target z position estimate,
v(1) target x velocity estimate.
v(2) target y velocity estimate,
v(3) target z velocity estimate,
a(1) target x acceleration estimate.
a(2) target y acceleration estimate.
a(3)]; target z acceleration estimate where r, v and a are the three dimensional position, velocity and acceleration vectors of the target vehicle. Initialization of these parameters, along with their covariance matrices, is done within relatively large bounds, with knowledge of the likely distance derived from brightness and/or other reasonable orbital limitations. Given that the tracker's position is known, the estimated relative position of the target to the tracker (rd) and its magnitude (rdmag) can be used to establish the H, or measurement matrix:

$$H(1,1) = (rdmag2 - rd(1)^2)/rdmag3.$$

$$H(1,2) = -(rd(2)*rd(1))/rdmag3;$$

$$H(1,3) = -(rd(3)*rd(1))/rdmag3;$$

$$H(2,1) = -(rd(1)*rd(2))/rdmag3;$$

$$H(2,2) = (rdmag2 - rd(2)^2)/rdmag3;$$

$$H(2,3) = -(rd(3)*rd(2))/rdmag3;$$

$H(3,1) = -(rd(1)*rd(3))/rdmag3;$ $H(3,2) = -(rd(2)*rd(3))/rdmag3;$ $H(3,3) = (rdmag2-rd(3)^2)/rdmag3;$ Measurement noise, defined as the RMS vertical and horizontal accuracy of the LOS measurement (track_err), is established in line of sight coordinates, and then rotated into ECI coordinates for use as the "R" matrix specified by the EKF equations.

$$Rlos = \begin{bmatrix} 1 & 0 & 0 \\ 0 & \text{track\_err}^{\wedge}2 & 0 \\ 0 & 0 & \text{track\_err}^{\wedge}2 \end{bmatrix}$$

The line of sight noise Rlos is rotated into inertial coordinates.

$psi = \tan^{-1}(rd(2), rd(1));$ $theta = \tan^{-1}(rd(3), \text{norm}(rd(1:2)));$ $phi = 0;$ and $Tilos = \text{cosine\_ypr}(psi, theta, phi).$ where cosine_ypr produces a cosine matrix using the yaw, pitch and roll Euler angles corresponding to psi, theta and phi respectively. This gives R=Tilos*Rlos*Tilos'.

The state transition matrix F incorporates the effects of the perceived gravitational model in a 9×9 array. F is the Jacobian of f, the function which propagates x old to x new. Rex, y & z are the estimated position of the target relative to the gravitational body, which are needed to establish acceleration so that the target states can be propagated forward one time step (dt).

$Rex = x(1);$ $Rev = x(2);$ $Rez = x(3);$ and $Re\_mag2 = Rex*Rex + Rev*Rev + Rez*Rez.$ $$F = \begin{bmatrix} 1 & 0 & 0 & dt & 0 & 0 & 0.5*dt^{\wedge}2 & 0 & 0 \\ 0 & 1 & 0 & 0 & dt & 0 & 0 & 0.5*dt^{\wedge}2 & 0 \\ 0 & 0 & 1 & 0 & 0 & dt & 0 & 0 & 0.5*dt^{\wedge}2 \\ 0 & 0 & 0 & 1 & 0 & 0 & dt & 0 & 0 \\ 0 & 0 & 0 & 0 & 1 & 0 & 0 & dt & 0 \\ 0 & 0 & 0 & 0 & 0 & 1 & 0 & 0 & dt \end{bmatrix};$$

$F(7:9, 1:9) = 0;$ $F(7,1) = -G*m\_earth*(Re\_mag2^{\wedge}(-3/2) - 3*Rex^{\wedge}2*(Re\_mag2^{\wedge}(-5/2)));$ $F(7,2) = 3*G*m\_earth*Rex*Rey*Re\_mag2^{\wedge}(-5/2);$ $F(7,3) = 3*G*m\_earth*Rex*Rez*Re\_mag2^{\wedge}(-5/2);$ $F(8,1) = 3*G*m\_earth*Rex*Rey*Re\_mag2^{\wedge}(-5/2);$ $F(8,2) = -G*m\_earth*(Re\_mag2^{\wedge}(-3/2) - 3*Rey^{\wedge}2*(Re\_mag2^{\wedge}(-5/2)));$ $F(8,3) = 3*G*m\_earth*Rey*Rez*Re\_mag2^{\wedge}(-5/2);$ $F(9,1) = 3*G*m\_earth*Rex*Rez*Re\_mag2^{\wedge}(-5/2);$ $F(9,2) = 3*G*m\_earth*Rex*Rez*Re\_mag2^{\wedge}(-5/2);$ $F(9,3) = G*m\_earth*(Re\_mag2^{\wedge}(-3/2) - 3*Rez^{\wedge}2*(Re\_mag2^{\wedge}(-5/2)));$ where G is the gravitational constant and m_earth is the earth mass.

The case illustrated shows how target position and velocity errors 18 and 20, respectively, steadily decrease overtime as sequential line of sight measurements are fed into the filter. To make this technique work, the position and velocity of the optical tracker must be known (updated and accurate) relative to the gravitational center of the Earth so that estimated accelerations can be calculated correctly for the target. The existence of a gravitational well is crucial to the proper convergence of the filter because without it, there is no observable difference between targets passing by slowly at short range versus targets passing by quickly from long range. Filters of this type have been in common use for several decades and are an innate part of various space situational awareness programs.

FIGS. 2a through 2c extend the concept from a fixed ground based sensor to a space-based sensor 22 such as on a satellite in orbit about the Earth. Here the problem is effectively identical to the case shown in FIGS. 1a-1c except that tracker position ($R_{trk}$) and velocity ($V_{trk}$) are substantially more dynamic. Position is typically established with GPS, permitting accurate estimates of the tracker position and velocity over time so that the basic construct of the EKF is unchanged from the case in FIGS. 1a-1c. The tracker position and velocity are provided as inputs to the EKF. Although performance is not substantially different, an orbital tracker has a different angle history relative to the target, producing a slightly different convergence history 24 and 26. This approach does have the drawback of requiring additional capability (e.g. GPS antenna and processing) to estimate the tracker position and velocity, which is then fed into the EKF with the LOS measurements.

SUMMARY OF THE INVENTION

The present invention provides a system and method for passive and autonomous navigation of space vehicles without a priori values for the position and velocity of either the target or tracker vehicle.

This is accomplished by reconfiguring the extended Kalman filter, or more generally any predictor/correction class filter, to include states for both the target and tracker vehicles. For the EKF, the measurement matrix H and state transition matrix F are reconfigured to include 18 states, 9 each for the tracker and the target. The target and tracker vehicles must both follow trajectories in an inertial frame of reference through the field of a body having a known gravitational model. Both vehicles must be objects that are under the influence of the gravitational body. The reconfigured filter simultaneously estimates the position and velocity of both tracking and target space-based vehicles from line-of-sight measurements. Known maneuvers such as a known acceleration of either vehicle, typically the tracker vehicle, may be provided to the filter. Depending upon the application, the position and velocity of either the tracker or the target or both vehicles may be output at the same or different times.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a-3c are diagrams of an extended Kalman filter satellite tracking system that uses only the line-of-sight measurements to a target satellite and a gravitational model to simultaneously infer both tracker and target satellite position and velocity;

DETAILED DESCRIPTION OF THE INVENTION

Figure 1B:
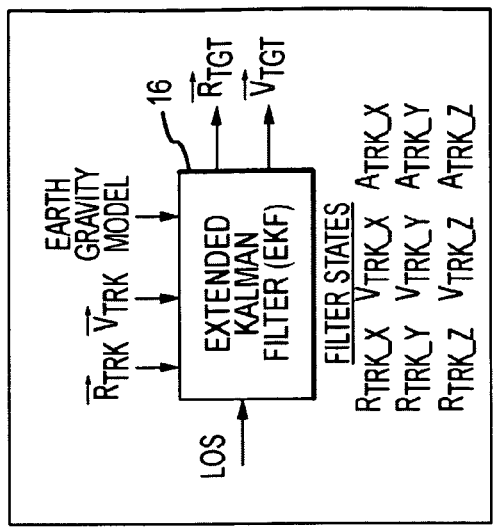
FIGS. 1a-1c, as describe above, are diagrams of an extended Kalman filter satellite tracking system that uses the known states for position and velocity of a fixed ground based sensor and line-of-sight measurements to a target satellite to infer target satellite position and velocity.
Figure 1C:
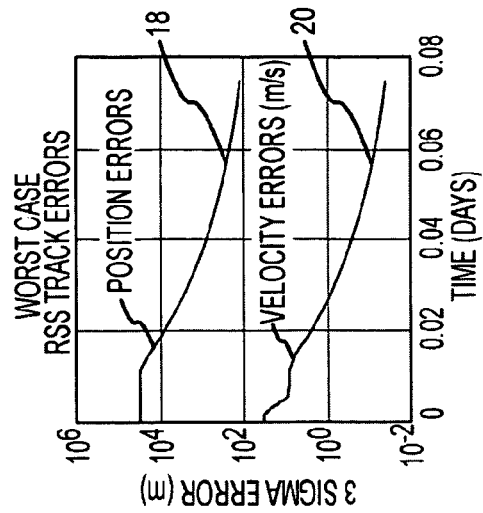
Figure 1A:
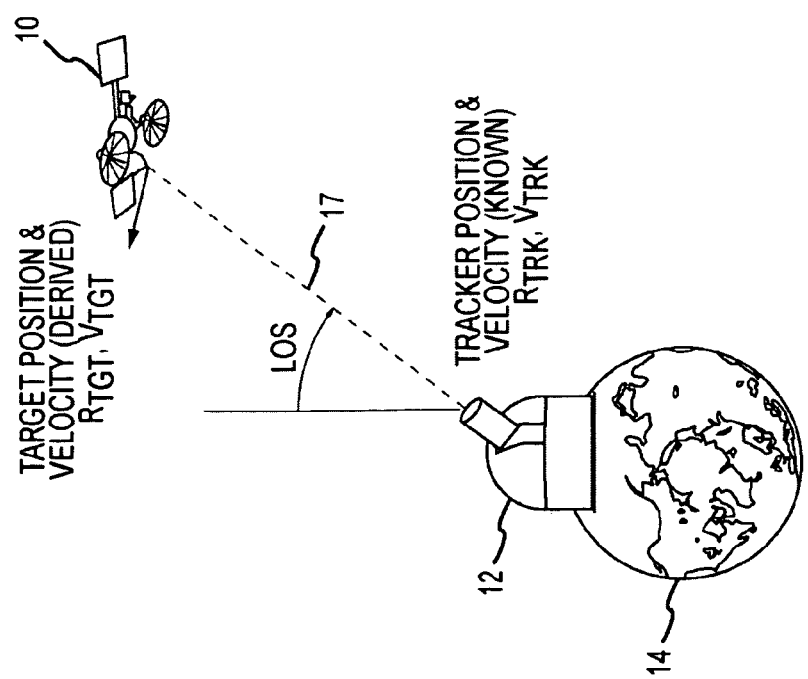

It is presumed and commonly accepted by those skilled in the art of satellite navigation and Kalman filter design that the filter must be provided with updated and accurate tracker position and velocity a priori in order to determine target position and velocity. Indeed, it is generally asserted that without a priori knowledge (known or measured values) of the tracker position and velocity, line of sight measurements between satellites do not contain adequate information to infer target states. The system is underdetermined and thus an infinite number of solutions exist.

In fact, if the extended Kalman filter is reconfigured there is sufficient observability to estimate both target and tracker states relative to an inertial frame of reference in the gravitational field of a gravitation body. Typically, the inertial frame of reference is coincident with an Earth centered coordinate frame (or that of the gravitational body) to simplify the filter equations and produce positions and velocities relative to Earth (gravitational body). This assertion relies on the assumption that both objects are under the influence of a known gravitational field; since this produces line of sight histories which are unique to the states of both the tracker and target. Time is known to establish the relative orientation of the known gravitational objects. It also relies on the assumption that neither the tracker nor target maneuver during the tracking epoch, or at least do not maneuver in an unknown way. Line of sight accelerations produced by tracker target accelerations are interpreted as gravitational attractions, and can produce filter divergence. Known maneuvers can be input into the filter as a priori information with the LOS measurements. Thus by reconfiguring the extended Kalman filter we eliminate the requirement to know or measure the tracker position and velocity.

In general the only requirement is that both objects are under the influence of a known gravitational field and that time is known. One or both objects may be satellites in orbit about the gravitational body. Alternately, one or both objects may follow non-orbital paths through the gravitation field such as by probes. One object may be the gravitational body, in which case the EKF provides the position and velocity of the other object. For example, the tracker vehicle may need to determine its position and velocity and may not be able to see another vehicle. One object may be fixed to the gravitational body. For example, the tracker may be positioned on Earth but its position and velocity are unknown or unmeasured.

As illustrated in FIG. 3a, a tracker satellite 50 and a target satellite 52 trace different orbits 54 and 56 through Earth's gravitational field. In general, the tracker and target space vehicles may follow arbitrary trajectories through the gravitation field of a gravitational body. If the space vehicles are in orbit around the body where orbit is defined as a periodic circling of the body the vehicles are considered to be satellites. The gravitational body is typically a planet (e.g. Earth 58), but could be the sun or the moon or any other body having a large enough mass to have an appreciable gravitational field.

Tracker satellite 50 makes a series of line-of-sight (LOS) measurements 60 (elevation and azimuth angles) in an inertial frame of reference 62 of the target satellite 52 producing a unique inertial LOS history. An inertial frame of reference is one in which Newton's first law of motion is valid, the law of inertia. Newton viewed the first law as valid in any reference frame moving with uniform velocity relative to the fixed stars; that is, neither rotating nor accelerating relative to the stars. In one embodiment, the LOS measurements are made with a passive EO sensor referenced with a star tracker. When the target object is additionally influenced by a gravitational body, the resulting angle history becomes unique for a given trajectory.

The EKF 64 processes the unique inertial LOS history to simultaneously infer both tracker satellite position ($R_{trk}$) and velocity ($V_{trk}$) and target satellite position ($R_{tgt}$) and velocity ($V_{tgt}$) in the inertial frame of reference. Depending upon the application, the tracker may read out the position and velocity information for both the tracker and target simultaneously, read the information serially alternating between tracker and target read out only the tracker information or read out only the target information. The key is that the EKF provides the position and velocity information of the target without knowing the position and velocity of the tracker a priori and provides the position and velocity of the tracker.

Figure 2B:
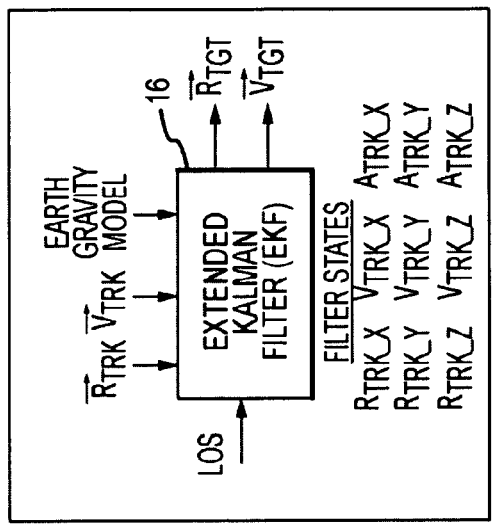
FIGS. 2a-2c, as describe above, are diagrams of an extended Kalman filter satellite tracking system that uses the known states for position and velocity of an orbiting sensor and line-of-sight measurements to a target satellite to infer target satellite position and velocity.
Figure 2C:
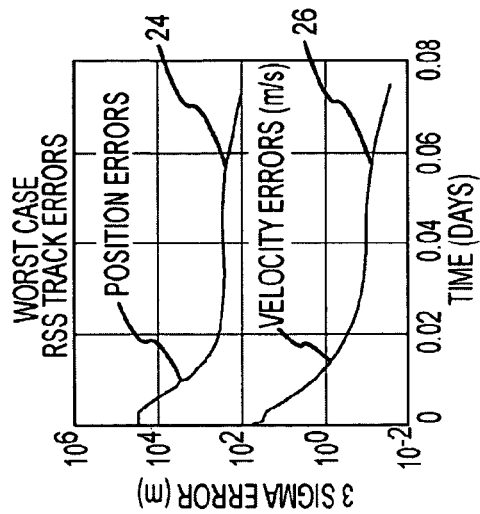
Figure 2A:
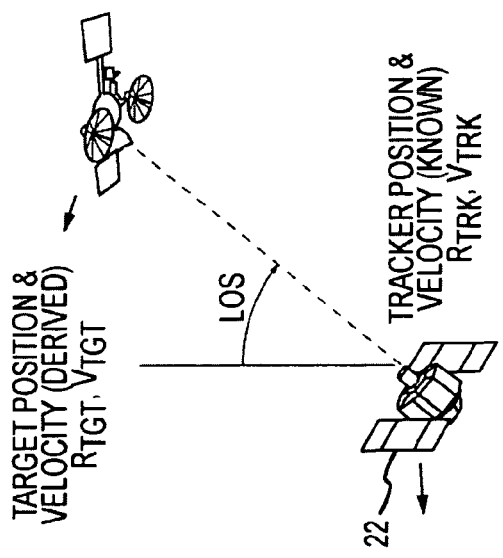
Figure 2A:
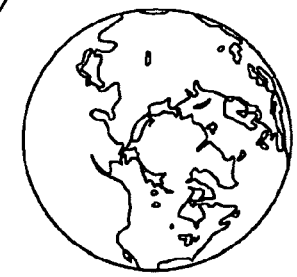
Figure 4:
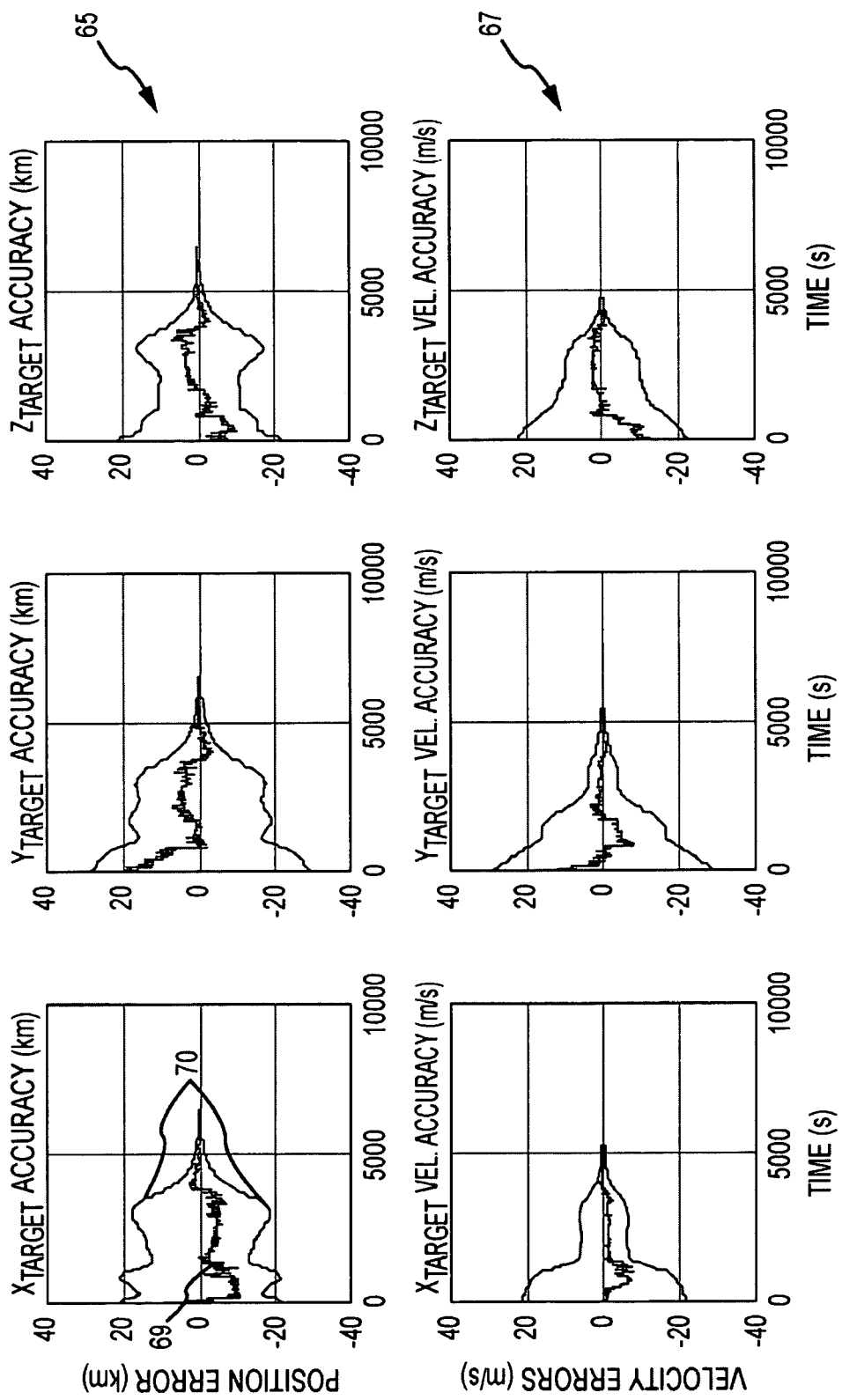
FIG. 4 is a plot of position and velocity error versus time for the X, Y and Z components of the target satellite.
Figure 5:
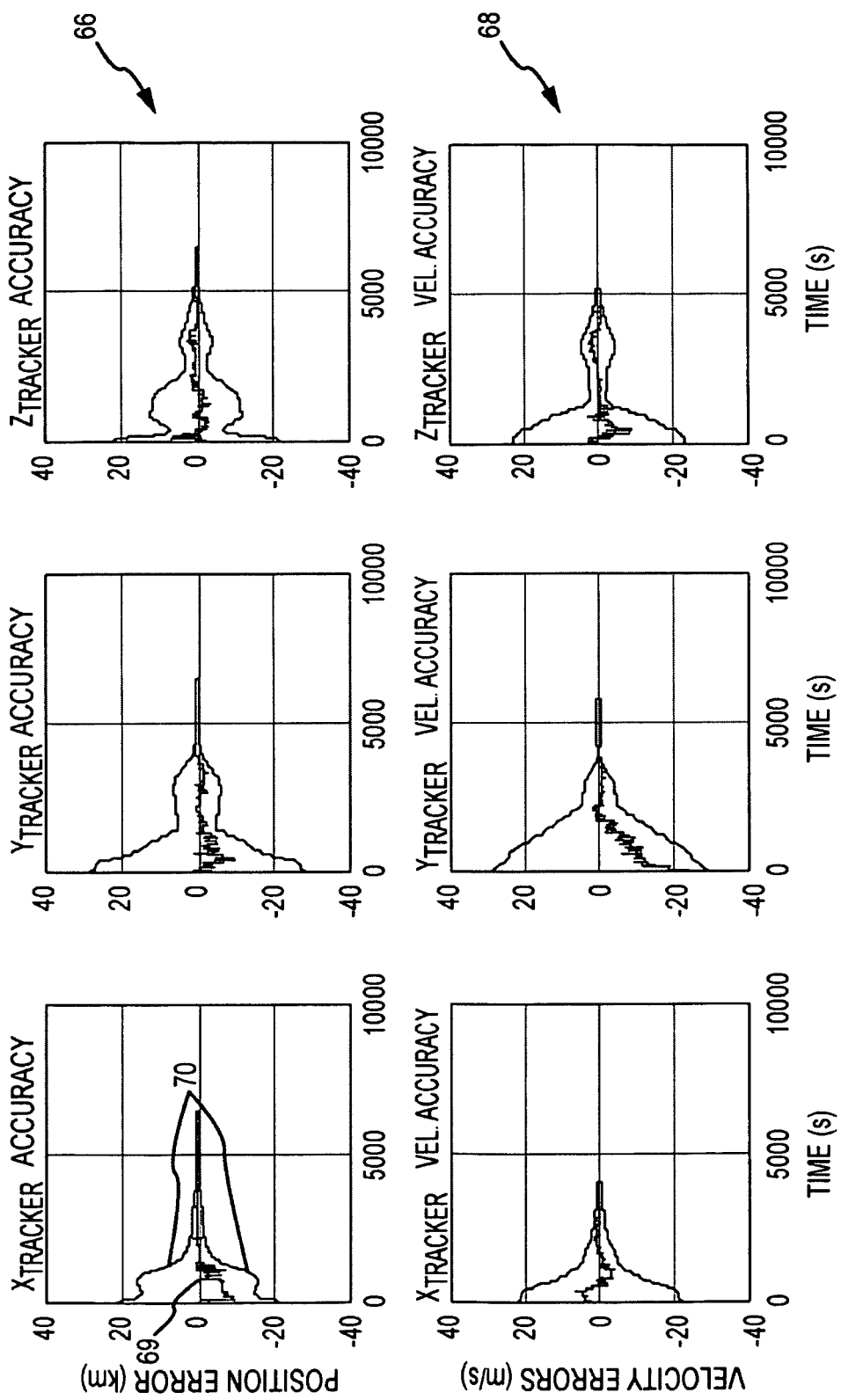
FIG. 5 is a plot of position and velocity error versus time for the X, Y and Z components of the target satellite.

For the precise same conditions as shown in FIG. 2c, the filter is run showing convergence over a 1.8 hour timeframe. Position 65, 66 and velocity 67, 68 of both the target and tracker states converge as shown in FIG. 3c, albeit slightly slower than the case when the tracker knows its own position and velocity a priori. FIGS. 4 and 5 detail the time convergence of the position 65, 66 and velocity 67, 68 for both target and tracker states over time, clearly showing the nonlinear effects of both orbits on filter performance. The state error 69 and 3σ covariances 70 are shown for each X, Y, Z coordinate for position and velocity.

As shown in FIG. 3b, the filter 64 is reconfigured to evaluate both tracker and target states with the line of sight history 60 and an Earth gravity model 71. Time is known by the EKF. The position and velocity of the tracker satellite are not known or measured a priori and are not input to the filter except as a very rough initialization. The reconfigured filter includes 18 states 72; 9 each for the tracker and the target. The reconfigured H and F matrices are therefore 18×18, as defined in an embodiment below. State propagation can be updated to include known target or tracker maneuvers.

Knowledge about the acceleration of either object can be added into the state update equations without directly effecting filter convergence. This technique is widely known for conventional 9-state EKFs, and commonly used to compensate for 'own ship' maneuvers. If either the tracker or more likely the target satellite performs an unknown maneuver, the EKF will detect the maneuver and either temporarily increase the amount of noise until filter regains track or reset and start again.

The state vector definition for the proposed filtering system is as follows:

x=[r(1) target x position estimate
r(2) target y position estimate
r(3) target z position estimate
v(1) target x velocity estimate
v(2) target y velocity estimate
v(3) target z velocity estimate
a(1) target x acceleration estimate
a(2) target y acceleration estimate
a(3) target z acceleration estimate
rt(1) tracker x position estimate
rt(2) tracker y position estimate
rt(3) tracker z position estimate
vt(1) tracker x velocity estimate
vt(2) tracker y velocity, estimate
vt(3) tracker z velocity estimate
at(1) tracker x acceleration estimate
at(2) tracker y acceleration estimate
at(3)] tracker z acceleration estimate.

The H matrix definition for the 18 state filter follows. Since tracker position and velocity are now unknown, rd is defined as the difference between the target and tracker estimated states:

$H = \text{zeros}(3,18);$ $H(1,1) = (rdmag2 - rd(1)^2)/rdmag3;$ $H(1,2) = -(rd(2)*rd(1))/rdmag3.$ $H(1,3) = -(rd(3)*rd(1))/rdmag3;$ $H(2,1) = -(rd(1)*rd(2))/rdmag3,$ $H(2,2) = (rdmag2 - rd(2)^2)/rdmag3;$ $H(2,3) = -(rd(3)*rd(2))/rdmag3.$ $H(3,1) = -(rd(1)*rd(3))/rdmag3;$ $H(3,2) = -(rd(2)*rd(3))/rdmag3;$ $H(3,3) = (rdmag2 - rd(3)^2)/rdmag3;$ $H(1,10) = -(rdmag2 - rd(1)^2)/rdmag3;$ $H(1,11) = (rd(2)*rd(1))/rdmag3;$ $H(1,12) = (rd(3)*rd(1))/rdmag3;$ $H(2,10) = (rd(1)*rd(2))/rdmag3;$ $H(2,11) = -(rdmag2 - rd(2)^2)/rdmag3;$ $H(2,12) = (rd(3)*rd(2))/rdmag3;$ $H(3,10) = (rd(1)*rd(3))/rdmag3;$ $H(3,11) = (rd(2)*rd(3))/rdmag3;$ $H(3,12) = -(rdmag2 - rd(3)^2)/rdmag3.$ The measurements and measurement noise aspects of the filter are identical to the 9 state case but the state transition matrix F is now expanded to a full 18 states containing propagation for both the tracking and target vehicles.

$Rex = x(1);$ $Rey = x(2);$ $Rez = x(3);$ $Re\_mag2 = Rex*Rex + Rey*Rey + Rez*Rez;$ $Rtex = x(10);$ $Rtey = x(11);$ $Rtez = x(12);$ $Rte\_mag2 = Rtex*Rtex + Rtey*Rtey + Rtez*Rtez;$ where Rtex/y/z are the estimated states of the tracker relative to the earth center.

$$F(1:6, 1:9) = \begin{bmatrix} 1 & 0 & 0 & dt & 0 & 0 & 0.5*dt^2 & 0 & 0 \\ 0 & 1 & 0 & 0 & dt & 0 & 0 & 0.5*dt^2 & 0 \\ 0 & 0 & 1 & 0 & 0 & dt & 0 & 0 & 0.5*dt^2 \\ 0 & 0 & 0 & 1 & 0 & 0 & dt & 0 & 0 \\ 0 & 0 & 0 & 0 & 1 & 0 & 0 & dt & 0 \\ 0 & 0 & 0 & 0 & 0 & 1 & 0 & 0 & dt \end{bmatrix};$$

$F(7,1) = -G*m\_earth*(Re\_mag2^{(-3/2)} - 3*Rex^2*(Re\_mag2^{(-5/2)}));$ $F(7,2) = 3*G*m\_earth*Rex*Rey*Re\_mag2^{(-5/2)}:$ $F(7,3) = 3*G*m\_earth*Rex*Rez*Re\_mag2^{(-5/2)};$ $F(8,1) = 3*G*m\_earth*Rex*Rey*Re\_mag2^{(-5/2)};$ $F(8,2) = -G*m\_earth*(Re\_mag2^{(-3/2)} - 3*Rey^2*(Re\_mag2^{(-5/2)}));$ $F(8,3) = 3*G*m\_earth*Rey*Rez*Re\_mag2^{(-5/2)};$ $F(9,1) = 3*G*m\_earth*Rex*Rez*Re\_mag2^{(-5/2)};$ $F(9,2) = 3*G*m\_earth*Rex*Rez*Re\_mag2^{(-5/2)};$ $F(9,3) = G*m\_earth*(Re\_mag2^{(-3/2)} - 3*Rez^2*(Re\_mag2^{(-5/2)}));$ $F(10:15, 10:18) =$ $$\begin{bmatrix} 1 & 0 & 0 & dt & 0 & 0 & 0.5*dt^2 & 0 & 0 \\ 0 & 1 & 0 & 0 & dt & 0 & 0 & 0.5*dt^2 & 0 \\ 0 & 0 & 1 & 0 & 0 & dt & 0 & 0 & 0.5*dt^2 \\ 0 & 0 & 0 & 1 & 0 & 0 & dt & 0 & 0 \\ 0 & 0 & 0 & 0 & 1 & 0 & 0 & dt & 0 \\ 0 & 0 & 0 & 0 & 0 & 1 & 0 & 0 & dt \end{bmatrix};$$

$F(16,10) = -G*m\_earth*(Rte\_mag2^{(-3/2)} - 3*Rtex^2*(Rte\_mag2^{(-5/2)}));$ $F(16,11) = 3*G*m\_earth*Rtex*Rtey*Rte\_mag2^{(-5/2)};$ $F(16,12) = 3*G*m\_earth*Rtex*Rtez*Rte\_mag2^{(-5/2)};$ $F(17,10) = 3*G*m\_earth*Rtex*Rtey*Rte\_mag2^{(-5/2)};$ $F(16,11) = -G*m\_earth*(Rte\_mag2^{(-3/2)} - 3*Rtey^2*(Rte\_mag2^{(-5/2)}));$ $F(17,12) = 3*G*m\_earth*Rtey*Rtez*Rte\_mag2^{(-5/2)};$ $F(18,10) = 3*G*m\_earth*Rtex*Rtez*Rte\_mag2^{(-5/2)};$ $F(18,11) = 3*G*m\_earth*Rtey*Rtez*Rte\_mag2^{(-5/2)};$ $F(18,12)=-G*m\_earth*(Rte\_mag2^{\wedge}(-3/2)-3*Rtey^{\wedge}2*(Rte\_mag2^{\wedge}(-5/2)));$ This reconfigured and expanded EKF 64 works because inertial line of sight histories 60 between two objects in a defined gravitational field, with the exception of some reductive cases, are unique to the trajectories of both the tracker object 50 and target object 51. This assertion is not intuitively obvious and is not understood by the space navigation community. This special structuring of the state propagation technique to include both tracker and target states within a known gravitational field 71 provides observability for both tracker and target states. This technique establishes a completely passive and autonomous navigation alternative for the future satellites. Incorporating this method into existing star trackers, for instance, offers the possibility of determining attitude, position and velocity with a single passive device.

Figure 6:
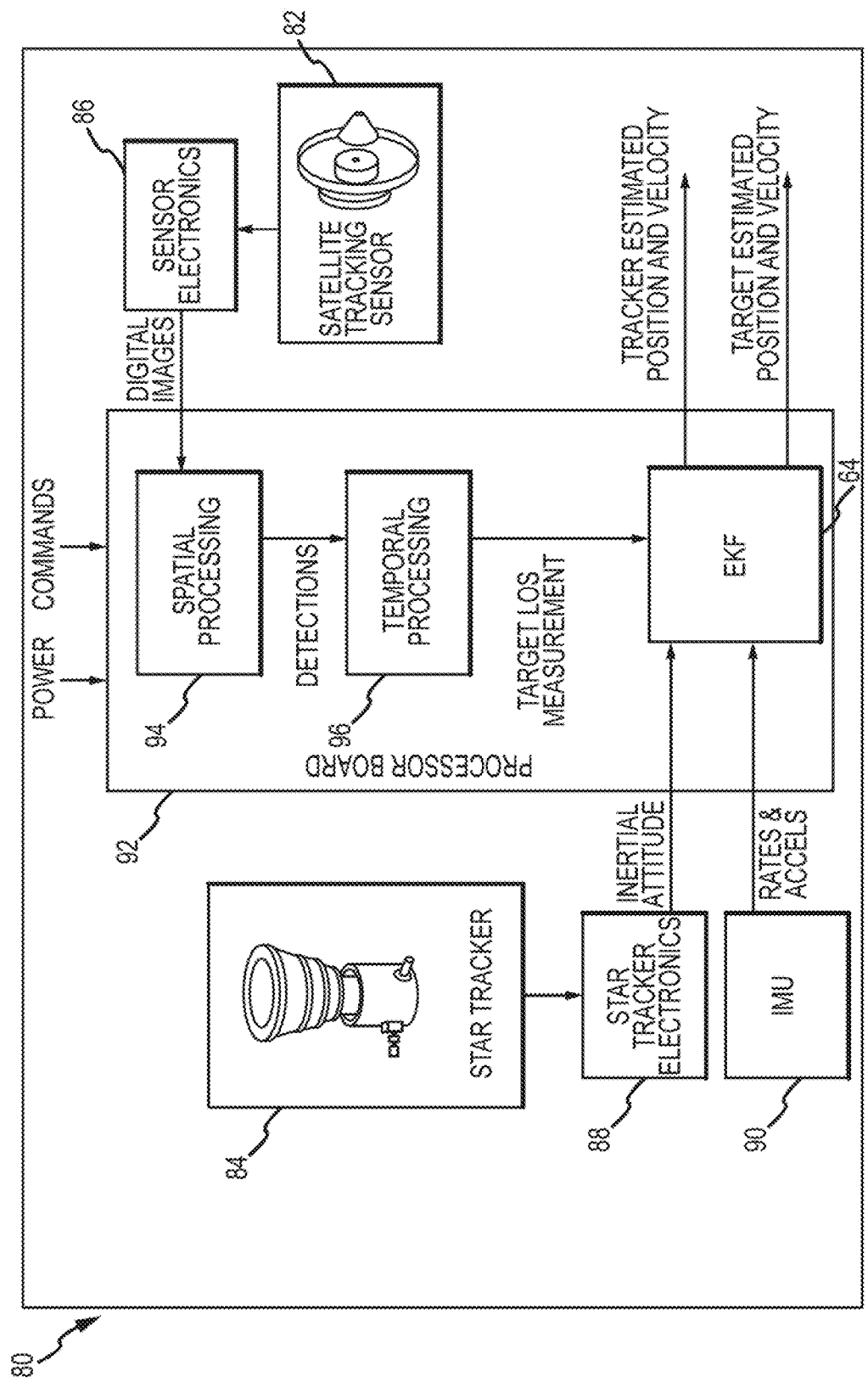
FIG. 6 is a block diagram of a fully passive autonomous navigation system.

A passive autonomous navigation system 80 that implements the reconfigured EKF 64 to simultaneously determine the position and velocity of both tracking and target space-based vehicles from line-of-sight measurements is shown in FIG. 6. This system is a passive and truly autonomous solution that does not rely on any other assets or require the addition of costly and heavy hardware. The system utilizes the satellite tracking sensor 82 and star tracker 84 already on-board the satellite vehicle. The satellite tracker sensor 82 and sensor electronics 86 provide a sequence of digital images of the target. The star tracker 84 and star tracker electronics 88 provide the inertial attitude of the tracker to establish the inertial frame of references for the LOS measurements. An inertial measurement unit (IMU) 90 provides rates and accelerations of the tracker itself for any "ownship" maneuvers. The digital images, inertial attitude and rates and accelerations are input to a processor(s) 92. Processor 92 implements a spatial processor 94 that processes the digital images to detect the target in the images. A temporal processor 96 processes the target detections to create a target LOS measurement and history. The reconfigured EKF 64 processes the target LOS measurement, inertial attitude and rates and accelerations in accordance with the gravitational model and outputs the tracker estimated position and velocity and target estimated position and velocity.

While the EKF is a popular and effective predictor/corrector filter, it is not the only possible embodiment of the above described technique. Any predictor/correction class filter could plausibly adopt this technique, though probably with less accuracy. For example, a fixed gain predictor/corrector could be used with plausibly good results and considerably lower computational requirements.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of autonomous space navigation, comprising:
   from a tracker space vehicle in a first trajectory through a gravitational field about a gravitational body, making a series of angle-only line-of-sight (LOS) measurements of a target space vehicle in a second trajectory through the gravitational field producing a unique inertial angle LOS history, wherein said angle-only LOS measurements are made in an inertial frame of reference centered about the gravitational body;
   providing an extended Kalman filter (EKF) based on a gravity model for said gravitational body and including a first set of states including position, velocity and acceleration for the target space vehicle in the inertial frame of reference centered about the gravitational body and a second set of states including position, velocity and acceleration for the tracker space vehicle in the inertial frame of reference centered about the gravitational body;
   inputting only the unique inertial angle LOS history and time into the EKF that updates said first and second sets of states to simultaneously infer position and velocity for both the target and tracker space vehicles in the inertial frame of reference centered about the gravitational body; and
   outputting the position and velocity for at least one of said target and tracker space vehicles.

2. The method of claim 1, wherein the EKF includes eighteen states, nine states each for the target space vehicle and tracker space vehicle including position, velocity and acceleration for each of the X, Y and Z axes in the inertial frame of reference.

3. The method of claim 1, wherein the gravity model provides an acceleration at a distance to the center of the gravitational body.

4. The method of claim 1, wherein the position and velocity for both the target and tracker space vehicles is output simultaneously.

5. The method of claim 1, wherein only the series of angle-only line-of-sight (LOS) measurements in the inertial frame of reference are made and made passively and autonomously.

6. The method of claim 1, wherein both the target and tracker space vehicles are satellites in orbit about the gravitational body.

7. An autonomous space navigation system for use with a tracker space vehicle in a first trajectory through a gravitational field about a gravitational body, comprising:
   a sensor system configured to make a series of angle-only line-of-sight (LOS) measurements of a target space vehicle in a second trajectory through the gravitational field producing a unique inertial angle line-of-sight (LOS) history, wherein said sensor systems makes the angle-only LOS measurements in an inertial frame of reference centered about the gravitational body; and
   an extended Kalman filter (EKF) based on a gravity model for said gravitational body including a first set of states including position, velocity and acceleration for the target space vehicle in the inertial frame of reference centered about the gravitational body and a second set of states including position, velocity and acceleration for the tracker space vehicle in the inertial frame of reference centered about the gravitational body, said EKF configured to process only the unique angle LOS history and time to update said first and second sets of states to simultaneously infer position and velocity in the inertial frame of reference centered about the gravitational body for the target and tracker space vehicles.

8. The autonomous space navigation system of claim 7, wherein said sensor system comprises only:
   a passive and autonomous LOS sensor system that makes the series of angle-only LOS measurements of the target space vehicle; and
   a passive and autonomous inertial attitude system that measures the inertial attitude of the tracker space vehicle to provide the inertial frame of reference.

9. The autonomous space navigation system of claim 8, wherein the passive LOS sensor system comprises:
   an electro-optic tracking sensor that captures a scene in space including the target space vehicle;

sensor electronics that processes the captured scene to produce a sequence of digital images;

a spatial processor that processes each digital image to detect the target space vehicle; and a temporal processor that processes the temporal sequence of detections to provide the series of angle-only LOS measurements.

10. The autonomous space navigation system of claim 8, wherein the passive inertial attitude system comprises:

a star tracker that images a star pattern in space; and star tracker electronics that processes the star pattern to provide the inertial attitude.

11. The autonomous space navigation system of claim 7, wherein the EKF outputs the position and velocity for both the target and tracker space vehicles simultaneously.

12. The autonomous space navigation system of claim 7, wherein the EKF includes eighteen states, nine states each for the target space vehicle and tracker space vehicle including position, velocity and acceleration for each of the X, Y and Z axes in the inertial frame of reference.

13. A method of autonomous space navigation, comprising:

from a tracker space vehicle in a first trajectory through a gravitational field about a gravitational body, making only a series of passive angle-only line-of-sight (LOS) measurements of an object in the gravitational field producing a unique inertial angle LOS history, wherein said angle-only LOS measurements are made in an inertial frame of reference centered about the gravitational body;

providing an extended Kalman filter (EKF) based on a gravity model for said gravitational body and including a first set of states including position, velocity and acceleration for the target space vehicle in the inertial frame of reference centered about the gravitational body and a second set of states including position, velocity and acceleration for the object in the inertial frame of reference centered about the gravitational body;

inputting only the unique angle LOS history and time into the EKF that updates said first and second sets of states to simultaneously infer position and velocity for the tracker space vehicle in the inertial frame of reference centered about the gravitational body; and outputting the position and velocity for said tracker space vehicle.

14. The method of claim 13, wherein the tracker space vehicle uses an electro-optic passive sensor to make the series of angle-only LOS measurements.

15. The method of claim 13, wherein the object is a target space vehicle in a second trajectory through the gravitation field, said EKF simultaneously infers position and velocity for both the target and tracker space vehicles in the inertial frame of reference centered about the gravitational body.

16. The method of claim 13, wherein the object is the gravitational body.

* * * * *